United States Patent
Ariel et al.

(10) Patent No.: US 9,158,001 B2
(45) Date of Patent: Oct. 13, 2015

(54) INDOOR SATELLITE NAVIGATION SYSTEM

(71) Applicant: GALILEO SATELLITE NAVIGATION LTD., Rishon Lezion (IL)

(72) Inventors: Eliyahu Ariel, Rishon Lezion (IL); Ran Zivhon, Rishon Lezion (IL)

(73) Assignee: GALILEO SATELLITE NAVIGATION LTD., Rishon Lezion (IL)

( * ) Notice: Subject to any disclaimer, the term of this patent is extended or adjusted under 35 U.S.C. 154(b) by 410 days.

(21) Appl. No.: 13/732,458

(22) Filed: Jan. 2, 2013

(65) Prior Publication Data

US 2013/0127662 A1  May 23, 2013

Related U.S. Application Data

(63) Continuation-in-part of application No. PCT/IB2011/052990, filed on Jul. 6, 2011.

(60) Provisional application No. 61/361,537, filed on Jul. 6, 2010.

(51) Int. Cl.
*G01S 19/11* (2010.01)

(52) U.S. Cl.
CPC ...................... *G01S 19/11* (2013.01)

(58) Field of Classification Search
CPC ................................ G01S 19/11; G01S 19/03
USPC .......................................... 342/357.48, 357.4
See application file for complete search history.

(56) References Cited

U.S. PATENT DOCUMENTS

| | | | | |
|---|---|---|---|---|
| 5,245,634 A | * | 9/1993 | Averbuch | H04J 3/0682 370/324 |
| 6,201,497 B1 | * | 3/2001 | Snyder | G01S 19/09 342/357.46 |
| 6,336,076 B1 | * | 1/2002 | Farley | G01S 19/258 342/357.41 |
| 7,023,382 B1 | | 4/2006 | Akano | |
| 7,342,538 B2 | | 3/2008 | Zimmerman | |
| 7,535,931 B1 | * | 5/2009 | Zampetti | H03L 7/08 370/252 |
| 2005/0015198 A1 | * | 1/2005 | Kee | G01S 1/20 701/408 |
| 2005/0086001 A1 | * | 4/2005 | Kim | G01S 19/11 701/469 |
| 2006/0244501 A1 | * | 11/2006 | Foerster | G01R 13/0254 327/207 |
| 2007/0052584 A1 | | 3/2007 | Horton et al. | |
| 2008/0284647 A1 | | 11/2008 | Oren et al. | |
| 2009/0115658 A1 | * | 5/2009 | Zimmerman | G01S 19/11 342/357.27 |
| 2009/0168808 A1 | * | 7/2009 | Cho | G04G 7/00 370/503 |
| 2010/0093374 A1 | | 4/2010 | Dacosta | |
| 2011/0050493 A1 | * | 3/2011 | Torimoto | G01S 19/11 342/357.29 |

\* cited by examiner

*Primary Examiner* — Harry Liu
(74) *Attorney, Agent, or Firm* — Mark M. Friedman

(57) ABSTRACT

A navigation system for an enclosed area, the navigation system comprising: a) at least one satellite signal receiving station, positioned outside the enclosed area, to receive satellite signals transmitted by a constellation of satellites and to determine time synchronization information relative to the transmitted signals; b) at least one local transmitting station, positioned within the enclosed area, to transmit a local signal compatible with the transmitted satellite signals; and c) a communication channel to communicate self-alignment information between each station and at least one other station; wherein each local transmitting station uses the self-alignment information to generate the local signal; and wherein the at least one local signal provides navigation information useable by a satellite navigation receiver.

27 Claims, 11 Drawing Sheets

$$PseudoRange = Range - clockbias$$
$$\rho_1 = \sqrt{(X-x_1)^2 + (Y-y_1)^2 + (Z-z_1)^2} - CdT$$
$$\rho_2 = \sqrt{(X-x_2)^2 + (Y-y_2)^2 + (Z-z_2)^2} - CdT$$
$$\rho_3 = \sqrt{(X-x_3)^2 + (Y-y_3)^2 + (Z-z_3)^2} - CdT$$
$$\rho_4 = \sqrt{(X-x_4)^2 + (Y-y_4)^2 + (Z-z_4)^2} - CdT$$

INDOOR SATELLITE NAVIGATION SYSTEM

BACKGROUND

1. Technical Field

Embodiments of the present invention relate generally to global navigation satellite systems (GNSS) and, more particularly, but not exclusively, to a system and method that extends navigation capability to enclosed areas that are substantially blocked from receiving satellite signals, such as the indoor area of buildings.

2. Description of Related Art

A global navigation satellite system (GNSS) consists of a network or constellation of satellites in orbit around the Earth, in which the satellites transmit signals that are used by terrestrial receivers for purposes such as navigation. The most established and widely used GNSS system at this time is the GPS system operated by the United States of America. Other GNSS systems include the GLONASS system operated by Russia, and the forthcoming European Galileo and Chinese Compass navigation systems. The present invention is described herein in terms of the GPS system, but it will be clear to those skilled in the art that the principles of the present invention may be used in the context of other GNSS systems.

The GPS system includes between 24 and 32 satellites in medium Earth orbit. Each satellite continuously transmits a navigation message that is modulated by its own unique PseudoRandom binary Code (PRN) that is orthogonal to all the other PRN codes from the other satellites. The GPS ranging code that is available for public use is the "Clear Acquisition" (C/A) code, which is a PRN code of 1,023 bits. The navigation message includes such information as its time of transmission, an ephemeris (plural: ephemerides), which precisely describes the satellite's orbit, and an almanac, which contains coarse orbit and status information for all the satellites in the network. The ephemeris is updated every two hours and is generally valid for four hours.

At the receiving end, the GPS receiver generates its own copies of the C/A codes, nominally synchronized with the satellite transmissions. When the receiver receives the C/A codes of the currently visible satellites (typically 8-12 satellites in open terrain), the receiver cross-correlates its copies of the C/A code with the received C/A codes to identify the satellites whose transmissions have been received. The ranges to the satellites may be determined by subtracting the time of transmission from the time received (to get transit time), and dividing by the speed of light. Knowing the ephemerides, the receiver can compute the locations of the satellites at the times of the transmissions.

If the receiver's clock were perfectly synchronized with the satellites, then signals from three satellites would suffice to triangulate the position (horizontal coordinates x and y, and elevation z) of the receiver. Because clocks that could be synchronized that well with the atomic clocks used by the satellites are far too expensive for routine use, signals from four or more satellites are used to determine x, y, z and the time offset dt of the receiver's clock from the GPS clocks. If only the horizontal coordinates are needed for navigation then signals from three satellites suffice.

FIGS. 1A and 1B illustrate the above process by which conventional GNSS receivers obtain position information from GNSS satellite signals. In FIG. 1A four satellites, Sat-1 to Sat-4, transmit navigation messages at times $t_1$ to $t_4$. The four signals are received by a GNSS receiver, shown being held by a user. The receiver identifies the four satellites from each satellite's unique C/A code. The range $\rho$ to each satellite is determined, as noted above, by subtracting transmitted time ($t_1$ to $t_4$) from the received time and dividing by the speed of light "C". From the ephemeris, the coordinate position of each satellite at the time of transmission may be determined, i.e. position of Sat-1 $(x_1, y_1, z_1)$, Sat-2 $(x_2, y_2, z_2)$, etc. FIG. 1B shows how the range and position values may be plugged into the four equations to determine the coordinate position (X, Y, Z) of the GNSS receiver, and the time offset "dT" of the receiver relative to the satellite clocks.

An aspect of GNSS based navigation is that navigation generally cannot be performed indoors, since building walls and roofs act as barriers that block or diminish the satellite signals. Similar problems occur in some outdoor areas such as natural canyons, urban areas lined with tall buildings ("urban canyons"), and deep mountain valleys. In these environments the satellite transmissions are either unavailable or have power levels that are very low, such as below the background noise power level, so as to be unusable by a standard, unmodified GPS receiver.

This is a problem since an estimated 80% of daily activity occurs in indoor environments, such as homes, offices, shopping areas, and elevators. Further, continuity of service is disrupted when, for example, a person walks from the street into a shopping mall or building, or drives into an underground parking lot or through a tunnel.

A number of attempts have been made to resolve this problem. In one approach, networks of physical sensors, such as infrared, ultrasound, or pressure sensors, are distributed throughout a building or enclosed area. A problem with physical sensors however is the need for a wide deployment of infrastructure.

Another approach makes use of a different type of sensor that allows positioning at the user end using autonomous means. These include odometer, accelerometer, gyroscope, and magnetometer type sensors. The principle of this approach is to use GNSS signals when available, and to switch to the other sensor when GNSS signals are not available. This approach however requires very accurate modeling of the user's movements to be effective.

Other approaches use modern telecommunication technology rather than physical sensors. For example, one method uses mobile telecommunication networks such as GSM and UMTS, implemented by techniques such as TDOA, E-TDOA, and "Angle of Arrival". This approach is considered impractical due to the requirement that for positioning, a minimum of three base stations have to be seen from the mobile terminal. The approach also suffers from positioning inaccuracy caused from signal multipath.

Another telecommunication approach makes use of free or publicly available infrastructure used for other purposes, such as mobile Internet access or WiFi. In this case, GNSS calculations are based on time measurements. However, time information supplied by non-GNSS sources is generally not accurate, causing a rough and jumpy effect on the resulting navigation outputs. For accurate implementation the time reference needs to be seriously upgraded as compared to current WLAN time capabilities.

Yet another location calculation technique is based on the Received Signal Strength Information (RSSI). This however requires the system to increase the number of Access Points to a level that is much greater than the number required for telecommunication purposes. These techniques also suffer from positioning inaccuracy caused from signal multipath.

Some approaches to the indoor navigation problem are GNSS-based. For example, one technique uses "pseudo satellites" or "pseudolites", which creates a local terrestrial constellation of a few satellites (generators for instance). A problem with this approach however is in achieving synchronization between pseudolites. Additionally, this technique suffers from positioning inaccuracy caused from signal multipath.

Another GNSS-based technique involves placing GNSS repeaters in the indoor area. The repeaters however merely transmit information of an outside location. As a result, this technique does not really provide indoor navigation information.

Accordingly, current indoor coverage technologies generally provide only limited and inaccurate navigation in building indoors and other confined or blocked spaces. Further, many of these technologies require some type of modification of the GNSS receiver to enable it to recognize and use aided or augmented information. This is inconvenient, increases the cost of the receiver, and is useful only in areas that happen to have the particular technology installed.

BRIEF SUMMARY

According to an aspect of the present invention, there is provided a navigation system for an enclosed area, the navigation system comprising:

a) at least one satellite signal receiving station, positioned outside the enclosed area, to receive satellite signals transmitted by a constellation of satellites and to determine time synchronization information relative to the transmitted signals;

b) at least one local transmitting station, positioned within the enclosed area, to transmit a local signal compatible with the transmitted satellite signals; and c) a communication channel to communicate self-alignment information between each station and at least one other station;

wherein each local transmitting station uses the self-alignment information to generate the local signal;

and wherein the at least one local signal provides navigation information useable by a satellite navigation receiver.

The navigation system wherein the satellite signal receiving station further includes a transmitter to transmit a local signal compatible with the transmitted satellite signals.

The navigation system wherein the self-alignment information includes information about local signal power levels.

The navigation system wherein the local signal comprises a simulation of at least three transmitted satellite signals.

The navigation system wherein the local signal comprises a simulation of four transmitted satellite signals.

The navigation system wherein the self-alignment information further communicates an identity of the multiple transmitted satellite signals.

The navigation system further comprising a plurality of said local transmitting stations, and wherein each station is operative to select channels different than the channels transmitted by adjacent stations.

The navigation system wherein each pair of adjacent stations are positioned apart by a respective separation distance, and wherein the transmission range of the local signals is greater than half the separation distance and less than the separation distance.

The navigation system wherein the local signal transmission range is approximately 0.7 of the separation distance.

The navigation system wherein the system comprises two satellite signal receiving stations positioned outside the enclosed area, and wherein the self-alignment information includes time synchronization information from two stations to each local transmitting station;

wherein the local signal transmitted by each local transmitting station provides substantially accurate positioning information for a two dimensional area.

The navigation system wherein the system comprises three satellite signal receiving stations positioned outside the enclosed area, and wherein the self-alignment information includes time synchronization information from three stations to each local transmitting station;

wherein the local signal transmitted by each local transmitting station provides substantially accurate positioning information for a three dimensional space.

The navigation system wherein each at least one satellite signal receiving station comprises a receiving antenna to receive satellite navigation signals, a transmitting antenna to transmit the local signal, and a processor to perform self-alignment algorithms.

The navigation system wherein the communication channel is wireless.

The navigation system wherein the communication channel comprises unused satellite navigation channels.

The navigation system wherein the communication channel comprises a wired connection between adjacent stations.

The navigation system wherein the local signal is modified in accordance with a weighting matrix.

According to an aspect of the present invention, there is provided a method of providing satellite signal information in an enclosed area, the method comprising:

a) deploying a plurality of local transmitters in the enclosed area; and b) transmitting local signals compatible with transmitted satellite signals;

wherein the local signals provide navigation information useable by a satellite navigation receiver.

The method of providing satellite signal information further including exchanging self-alignment information with the local transmitters.

The method of providing satellite signal information wherein the local signals provide information from a plurality of satellites.

The method of providing satellite signal information further comprising modifying the local signal in a manner that improves an accuracy of a self-location calculation performed by the satellite navigation receiver. Preferably, such modification includes appropriate linear or non-linear transformation of respective vectors of differential ranges of the satellites whose signals are emulated by the local transmitters.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be further understood and appreciated from the following detailed description taken in conjunction with the drawings in which.

DETAILED DESCRIPTION

Figures 1A, 1B:
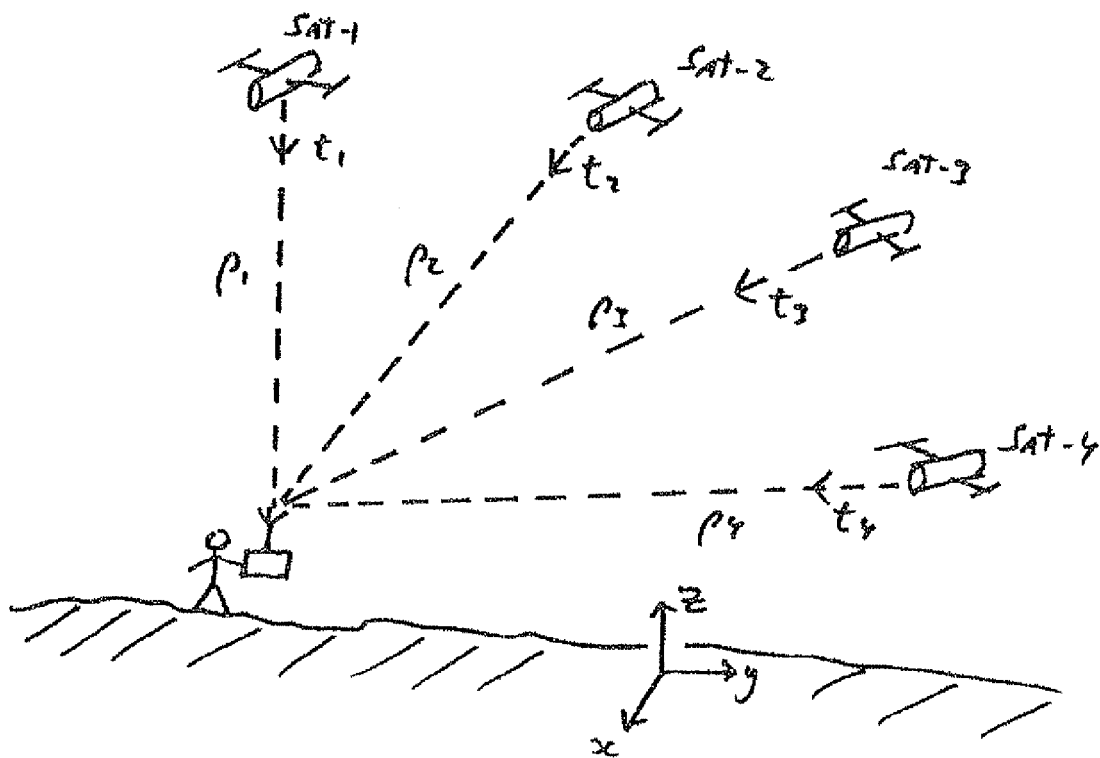
FIG. 1A is a graphical representation of a satellite navigation system of the prior art showing four satellites and a user holding a GNSS receiver.
FIG. 1B is an illustration of mathematical equations used in a satellite navigation system of the prior art.

Reference will now be made in detail to embodiment(s) of the present invention, examples of which are illustrated in the accompanying drawings, wherein like reference numerals refer to the like elements throughout. The embodiment(s) is/are described below to explain the present invention by referring to the figures.

Figure 2A:
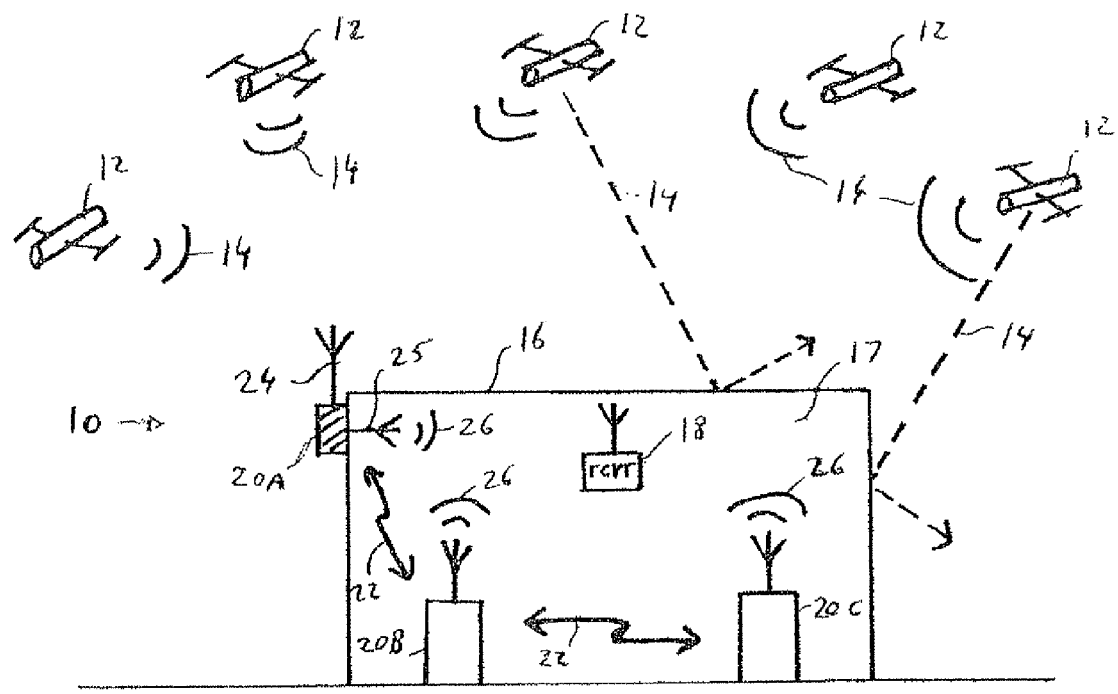
FIG. 2A is a block diagram of an indoor satellite navigation system consistent with an embodiment of the present invention, showing the system in use in an enclosed area and having a live connection with satellites overhead.

Referring now to FIG. 2A, there is shown a block diagram of an indoor satellite navigation system 10 consistent with an embodiment of the present invention. The figure shows five satellites 12 that are part of a global navigation satellite system (GNSS). The satellites 12 are in space orbit, and transmit GNSS signals 14 towards the ground. As shown, there is located on the ground a building or location 16 which contains an enclosed area 17. The satellite GNSS signals 14 are unable to enter enclosed area 17 due to the barrier of the building roof and walls. Accordingly, a GNSS or GPS receiver 18 located inside the building, in enclosed area 17, is unable to obtain the information needed to operate and to provide position information.

For further clarity, the term "enclosed area" or "enclosed area 17" refers to any completely or partially enclosed space, area, or environment from which GNSS signals are completely, substantially, or partially blocked from entering, so that GNSS signal strength is too low for use or completely unavailable. A wide variety of enclosed areas are comprehended, including for example inner building floors and locations, shopping malls, underground parking lots and garages, elevators, hidden mountain roads, streets of urban canyons where high rises block GNSS signal reception, tunnelled roads, vessels, and airplanes. Similarly, the term "outdoor area" refers to space, areas, or environments that are not enclosed areas, i.e. where typical GNSS signals are received by GNSS receivers and which retain sufficient power so that they can be processed to determine positioning results.

According to some embodiments, system 10 of the present invention includes at least two stations or "micro simulators" (MS) 20 which are installed at the site of building 16 and enclosed area 17. A micro simulator is a device that has a multichannel GNSS transmitter, a GNSS receiver, and additional processing and communication components that enable it to transmit and imitate GNSS satellite signals, and to exchange information with other micro simulators.

Micro simulators may be characterized by whether their transmitter (Tx) and receiver (Rx) operate inside enclosed area 17, i.e "In" or indoor, or outside enclosed area 17, i.e "Out" or outdoor. An "outdoor micro simulator" is one for which either the Tx or Rx operate outdoors, and the other antenna component operates indoors. An "indoor micro simulator" is one for which both the Tx and Rx operate indoors. Accordingly, there are three types of MS: an "Rx-Out-Tx-In" outdoor MS, an "Rx-In-Tx-Out" outdoor MS, and an indoor MS, which is always "Rx-In-Tx-In".

An outdoor MS of the type "Rx-Out-Tx-In" has a receiver that is located outdoor and that can receive GNSS satellite signals 14 directly from satellites 12, similar to a GNSS receiver. The outdoor MS of the type "Rx-In-Tx-Out" has a transmitter that is capable of providing outside coverage. This type of MS may optionally be used to provide additional coverage in certain situations. In many applications there will be relatively large numbers of indoor micro simulators, as this type of MS is used to span and provide continuous navigation coverage within enclosed area 17.

Turning to FIG. 2A, it may be seen that in this example system 10 has three micro simulators: outdoor MS 20A, and indoor micro simulators 20B and 20C. Outdoor MS 20A has a receiver 24 that is outdoors and that can receive satellite signals 14, and a transmitter 25 which transmits indoors, i.e in enclosed area 17. Indoor micro simulators 20B and 20C both receive and transmit within enclosed area 17. For greater clarity, in the figures outdoor micro simulators are shown shaded and indoor micro simulators are shown unshaded.

System 10 also includes a means of communication between micro simulators to enable transmission and exchange of certain information. This is represented in FIG. 2A by line 22. As will be discussed in greater detail below, communication line 22 may be implemented by a variety of embodiments, including for example wired or wireless techniques, and accordingly may or may not involve actual additional physical hardware.

At least one MS acts as a synchronization master MS (or just "master MS"), which is an MS that knows its position. A master MS may be an outdoor MS that has a receiving antenna Rx that can receive GNSS signals 14 from satellites, and from that determine its position. An indoor MS can also be a master MS, even though it can't receive a GNSS signal from a satellite, as long as it is provided with its position by a system administrator. For example, a survey may be performed to determine its position, and this value entered into the processor of the indoor MS.

Information flows sequentially through each MS in system 10, beginning with a master MS. For example, in FIG. 2A information flows from outdoor MS 20A (assuming it is a master MS) to indoor MS 20B, and from indoor MS 20B to indoor MS 20C. The embodiment of FIG. 2A may be called a "live connection" type since it has an outdoor MS which maintains a live connection to active GNSS satellites and can actively obtain its position.

Each MS 20 in FIG. 2A transmits a local GNSS signal 26 which contains the signals that would be received from four or more (typically four) of the GNSS satellites at a nominal location, if those satellites were visible from that location. The local GNSS signal 26 may be described as a simulated satellite signal produced by MS 20. The nominal location is typically the MS location, but it may also be a different location that is related to or offset from the MS location. Accordingly, in FIG. 2A, GNSS receiver 18 may move about enclosed area 17 and obtain relevant location readings.

Figure 2B:
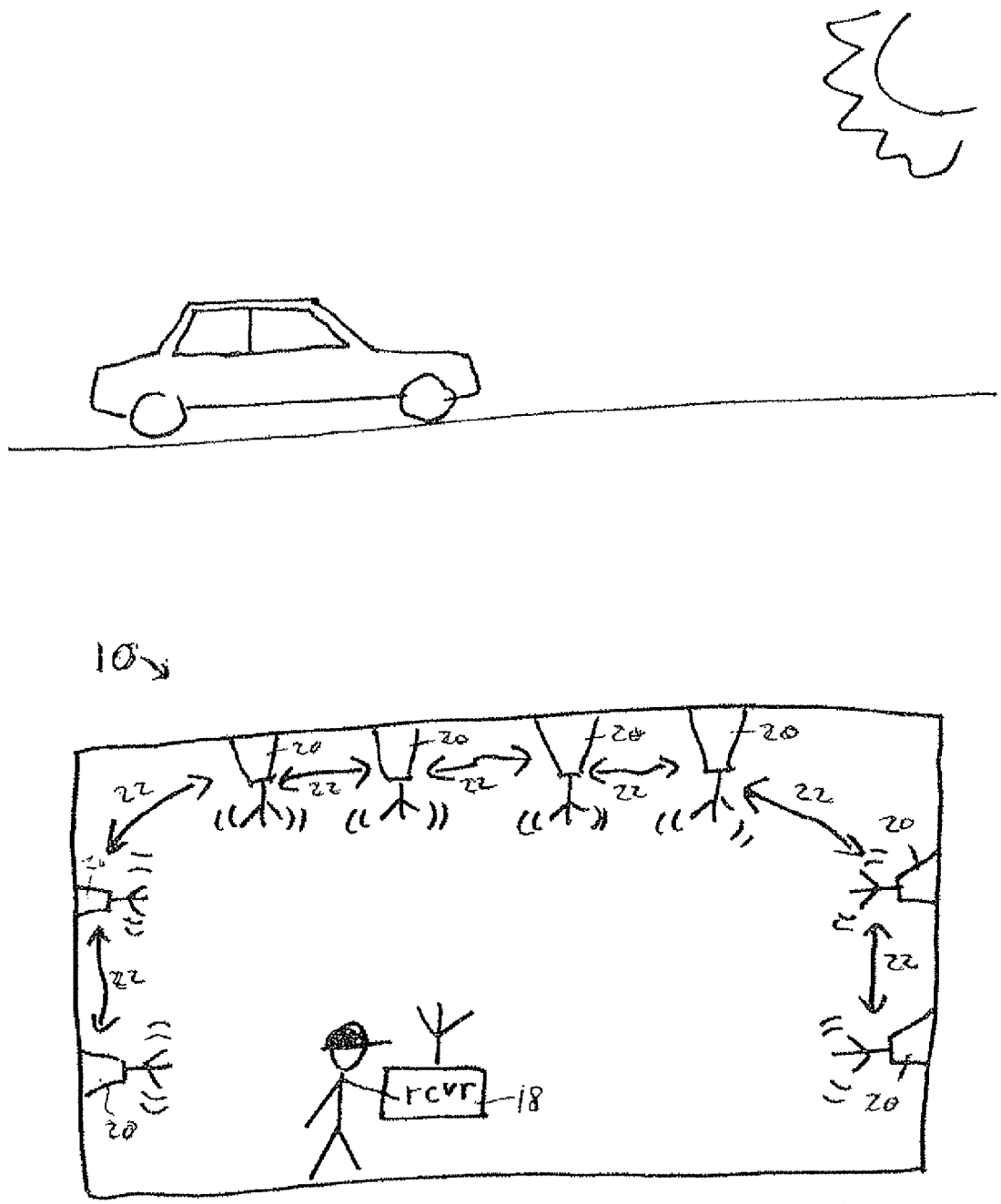
FIG. 2B is a block diagram of an indoor satellite navigation system consistent with an embodiment of the present invention, showing the system in use in an enclosed area that is stand-alone.

Another embodiment of system 10 is shown in FIG. 2B. In this embodiment the enclosed area is totally underground, for example a mine. Accordingly all of the MS's are indoor micro simulators. Since there are no outdoor MS's and no live connection to satellites 12, this type of system is called "stand alone". In this embodiment one or more of the MS's are master MS's who are supplied with their position. It may be noted that the position supplied does not have to be the true position. It could be arbitrary, and the system will work because all of the other MS's will be synchronized and in a consistent relationship to the master MS. The stand alone system shown will work with stored or historical satellite data that is provided to the units.

In practice, GNSS systems are always in motion, since each satellite in view delivers a continuous stream of navigation messages while in motion, and individual satellites are constantly coming in and going out of view. As will be described in greater detail below, system 10 of the present invention is able to adapt or self-align to these and other changes, so that it is able to maintain full and continuous navigation coverage in enclosed area 17. These adaptations include, for example, adjusting any or all of the timing, satellite selection, and power of local GNSS signals 26, and providing updated ephemerides of visible satellites.

Accordingly, it is to be appreciated that system 10, according to some embodiments of the present invention, adds practical navigation signals and supports full, continuous navigation coverage by GNSS receivers in environments where GNSS signals are absent or for practical purposes do not exist.

Figure 3:
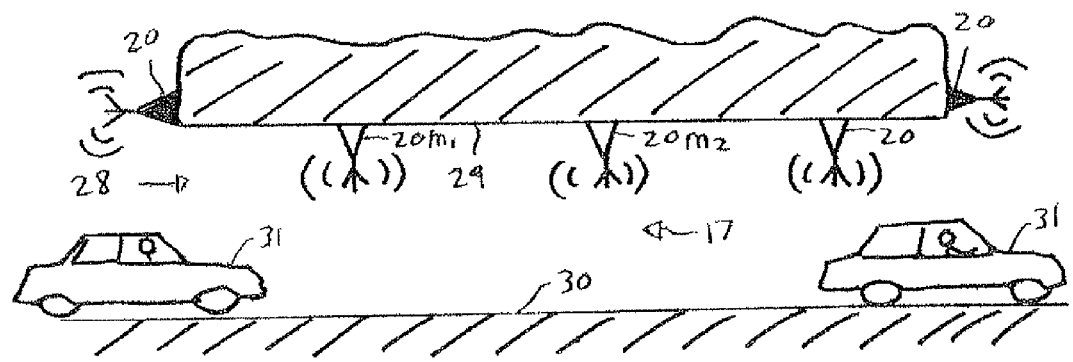
FIG. 3 is an illustration of an indoor satellite navigation system consistent with an embodiment of the present invention, showing the system in use in a tunnel.
Figure 4:
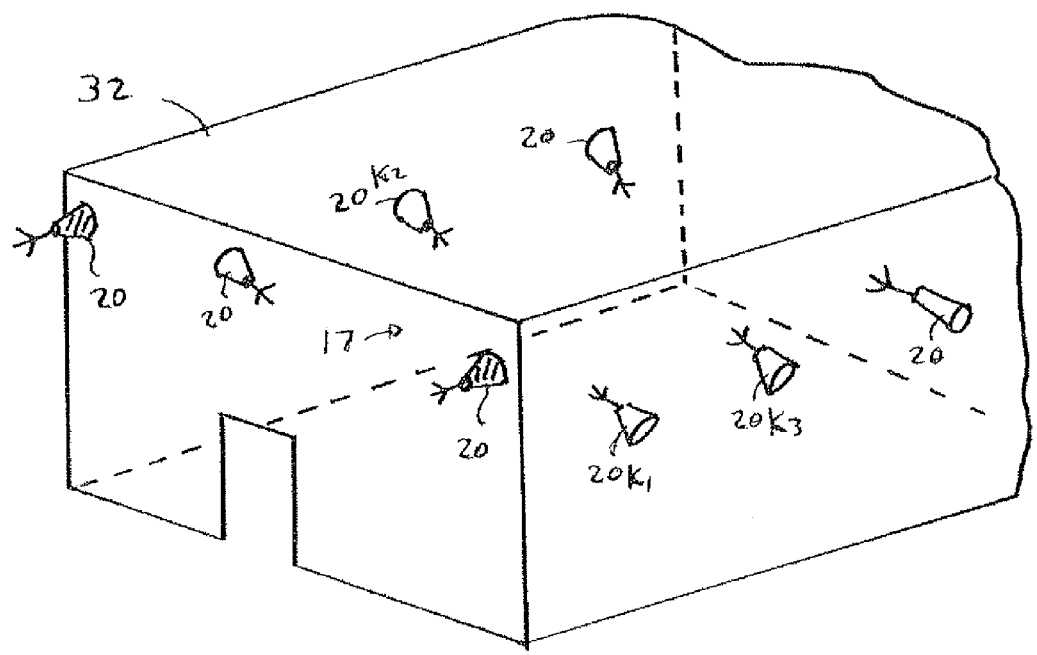
FIG. 4 is an illustration of an indoor satellite navigation system consistent with an embodiment of the present invention, showing the system in use in a single story indoor environment.
Figure 5:
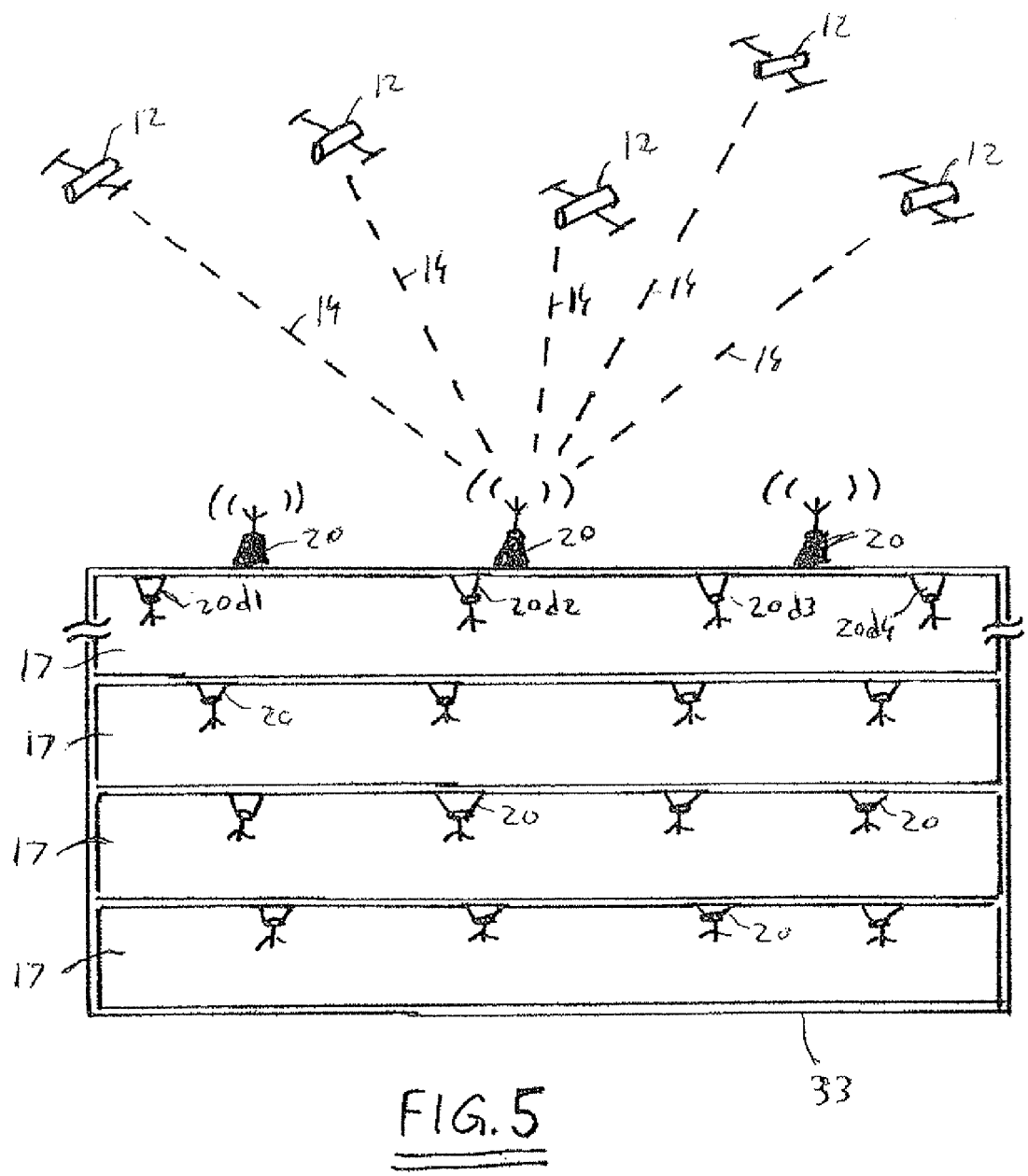
FIG. 5 is an illustration of an indoor satellite navigation system consistent with an embodiment of the present invention, showing the system in use in a multi-story indoor environment.

FIGS. 3-5 are provided to illustrate example configurations or applications of system 10 of the present invention.

FIG. 3 shows a side view of a tunnel 28 having a roof 29 and a road surface 30 for transport of pedestrians and vehicles such as automobiles 31. Satellite navigation would ordinarily not be possible in enclosed area 17 inside tunnel 28 due to the blocking of satellite signals 14 by roof 29. As shown, system 10 may include two outdoor micro simulators 20, positioned outside the tunnel at either end, and a group of indoor micro simulators 20 inside the tunnel. While three indoor micro simulators 20 are shown, it may be appreciated that as many indoor micro simulators 20 may be installed as necessary to provide continuous coverage over the length of the tunnel.

Two outdoor micro simulators 20 are used in this example, positioned at the entrance and exit at opposite ends of the tunnel. In configuring system 10 of the present invention, either one of the outdoor micro simulators would have an outdoor Rx (i.e. Out-Rx-In-Tx) and the other one could have an outdoor Tx (i.e In-Rx-Out-Tx). The Out-Rx MS would receive satellite signals 14 from overhead satellites 12 and be the master MS. Communication would proceed from that MS through the indoor micro simulators, until termination at the Out-Tx outdoor MS 20. While the terminating outdoor MS is not used to receive satellite, signals 14, its outdoor location is still useful to ensure that GNSS reception during travel into or out of the tunnel is smooth and uninterrupted.

In FIG. 3 the indoor micro simulators are shown attached to roof 29 of the tunnel. Since the users of the tunnel are pedestrians and drivers who will be closer to the road surface 30, in this situation it would be useful to configure local GNSS signal 26 so that it provides a nominal location on the road, below and offset from the actual roof location of MS 20.

FIG. 4 shows a perspective view of a single story building 32, or of a floor in a building. In this configuration there are two outdoor micro simulators 20, and a group of indoor micro simulators 20 that span enclosed area 17. In this example both outdoor micro simulators 20 may have an outside Rx and receive satellite signals 14.

In another example, FIG. 5 shows a side view of a multistory building 33. This setup could represent an office or condominium tower, a shopping center, or parking garage, among others. As shown, system 10 could be configured with three outdoor micro simulators 20 of Rx-Out-Tx-In type on the roof. Each floor could have a group of indoor micro simulators 20 that span the interior, similar to that shown in the example of FIG. 4.

In general, it is useful to place micro simulators at each entrance and/or exit of a building, and next to specific stores in the case of a shopping mall, for example. If there are obstacles such as pillars or posts then additional micro simulators may be needed to provide continuous coverage.

Figure 6:
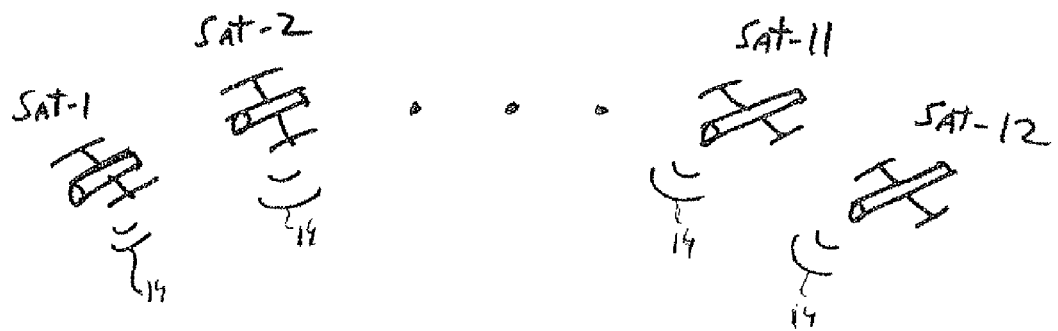
FIG. 6 is a block diagram of a portion of an indoor satellite navigation system consistent with an embodiment of the present invention, showing three micro simulators and certain relationships between them.
Figure 6:
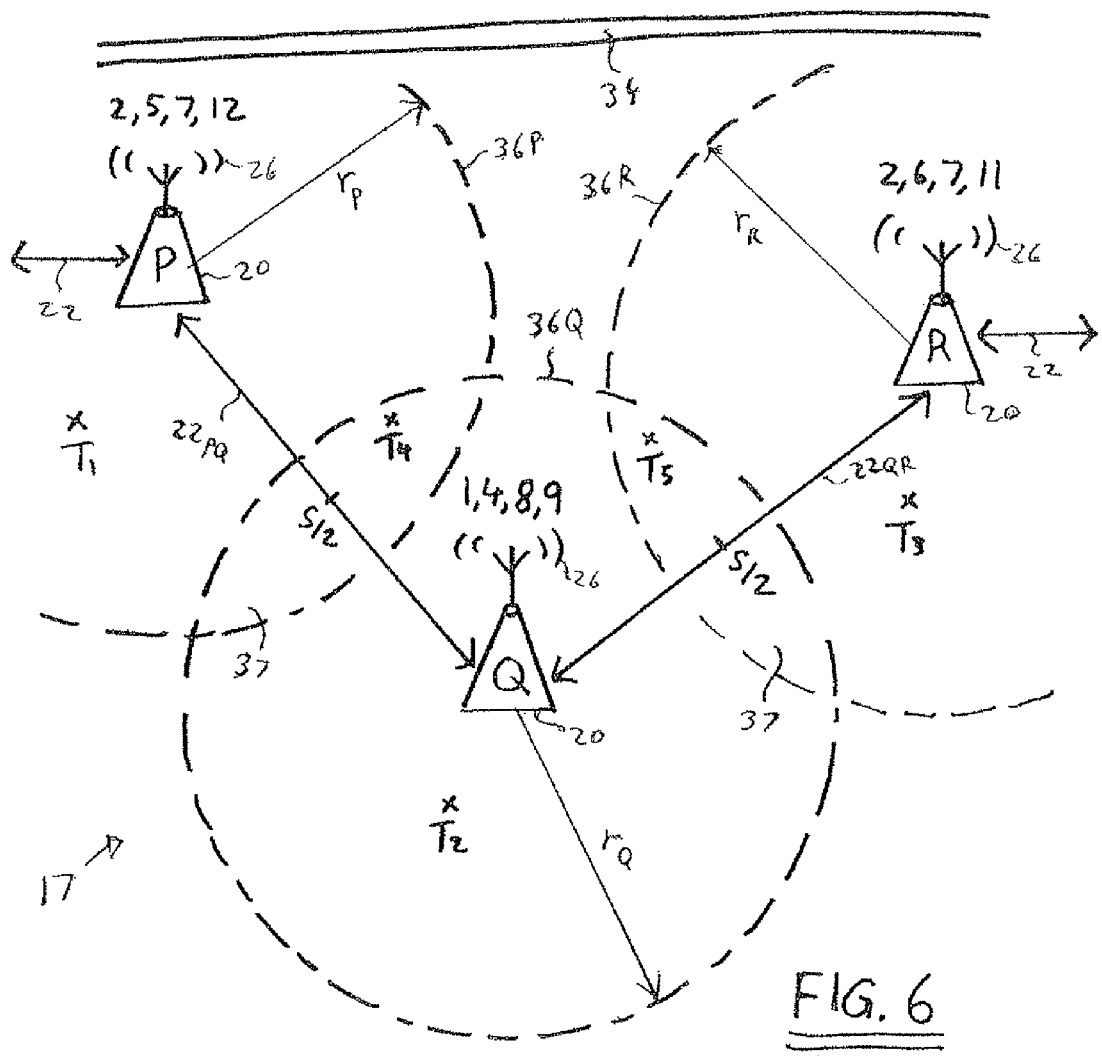

FIG. 6 is a graphical representation of a portion of system 10 that may be used to illustrate some of the principles of operation of the invention. As indicated, the figure shows three micro simulators, which presumably are part of a much larger network of micro simulators from an installation of system 10. The three MS's are designated by the letters "P", "Q", and "R", or equivalently by MS 20P, MS 20Q, and MS 20R. MS 20Q is an indoor MS, and MS 20P and MS 20R may be either outdoor or indoor MS's. For the purposes of analysis, MS 20P and MS 20R are assumed to be indoor MS's.

The figure also shows information communication lines 22*pq* and 22*qr*, to represent the information flow or communication channel between adjacent MS's P and Q, and Q and R, respectively. Other communication lines 22 are shown that connect MS's P and R to other MS's not in the figure. The information flow or sequence is presumed to be from left to right, i.e. from an outside MS to MS 20P, then from MS 20P to MS 20Q, then from MS 20Q to MS 20R, and then from MS 20R to an outside MS.

In order to view these three micro simulators, which form only a portion of system 10, in context, FIG. 6 also shows a constellation of twelve satellites overhead, which are identified by numbers 1 to 12. There is also shown a barrier 34 which represents any type of signal block, such as a roof of a building or a land mass forming the upper portion of a tunnel, for example. As a result, all of the area in FIG. 6 below barrier 34 is blocked enclosed area 17.

According to some embodiments of the invention, the three micro simulators shown, P, Q, and R, along with the other micro simulators in the system, are positioned so that they are separated from each other by a substantially equal distance, designated "S". Accordingly, it is to be appreciated that the number of micro simulators needed to adequately span a given space may be determined by dividing the length of the space by separation distance "S". More particularly, while the micro simulators may be placed at any separation distance that is convenient, it is advantageous to keep the separation distance fairly uniform, for reasons that are discussed further below. In FIG. 6, for ease of illustration, the communication lines 22pq and 22qr may also be used to represent the separation distance between MS's. Accordingly, line 22pq may be said to represent a separation distance "S" between MS 20P and MS 20Q, and line 22qr similarly represents a separation distance "S" between MS 20Q and MS 20R.

Each MS is transmitting on its transmitter Tx its own local GNSS signal 26. Each MS is also receiving on its receiving antenna Rx the local GNSS signal 26 of its neighboring MS that precedes it in the information flow sequence. Specifically, MS 20P receives or detects the local GNSS signal from an MS to its "left" that is not shown in the figure, MS 20Q receives local GNSS signal 26 transmitted by MS 20P, and MS 20R receives local GNSS signal 26 transmitted by MS 20Q. The use to which these received signals are put will be described further below.

It may be noted that since the local GNSS signals 26 are transmitted at very low power, in order to detect these signals the micro simulators are configured to have, according to some embodiments of the invention, receivers Rx having a very high level of sensitivity.

As noted, communication of synchronization information between micro simulators, as represented in the figures by line 22, may be implemented in a variety of ways. According to some embodiments, communication may be through a dedicated wired local area network. This may include, for example, optical fiber or copper wire based networks.

Another approach is to employ wireless communication techniques. This has the advantage of using hardware that is already present, so that costs and components may be kept to a minimum. There are several ways that information may be transmitted on unlicensed frequency bands outside of the GNSS frequency bands, to keep the information signals from interfering with the navigation signals. One way is to use frequency division multiple access, which is analogous to the use of a WiFi wireless LAN. Another way is to use separate directional transmitting and receiving antennas on the micro simulators. A third, less preferred way is to use time division multiple access. In this technique, the transmission of the simulated satellite signals 26 is occasionally paused to allow the exchange of information.

Another way of keeping the synchronization signals from interfering with the navigation signals takes advantage of the fact that the GPS system uses only 36 of the 1023 possible GPS C/A codes. Since seven C/A codes are reserved for satellite-based augmentation systems, there remain 980 C/A codes available for use by system 10 for transmitting other information. Because the C/A codes are mutually orthogonal, the GPS receiver will ignore the C/A codes that are used for transmitting the synchronization signals.

The transmitters and receivers provided in the micro simulators may be adapted for use with whichever method is selected to communicate synchronization information.

According to some embodiments of the invention, in order to provide effective and continuous GNSS signal coverage for enclosed area 17, the micro simulators need to maintain certain conditions in the system relating to the power of transmission, selection of satellites transmitted, and synchronization or timing of the local GNSS signals. Additionally, updated ephemeris information for satellites in view by outdoor micro simulator needs to be provided. The particulars of these conditions and the procedures used to maintain them will now be discussed.

Beginning with the power requirements, according to some embodiments of the invention, where the separation distance between adjacent micro simulators is "s", the effective range of transmission of each micro simulator's local GNSS signal 26 should be approximately 1.4 times the halfway point, or about 0.7 of the separation distance "s".

This aspect of system 10 of the present invention is shown in FIG. 6. The halfway point between micro simulators 20P and 20Q, and between 20Q and 20R, is shown as "s/2". The range of transmission "r" of each micro simulator is illustrated for each MS by an arrow "r" and a dashed circle 36. It can be seen that the range of transmission, as represented by the circles 36, extends past the halfway point s/2 of separation lines $22_{PQ}$ and $22_{QR}$ (note that the figure is not drawn to scale). FIG. 6 also shows how adjacent circles 36 intersect, so that an overlap area 37 is defined in the transmission range between adjacent micro simulators.

The effect of this signal power configuration may now be reviewed. When GNSS receiver 18 is located within the transmission range r of a micro simulator but not in an overlap area, the predominant signal received will be local GNSS signal 26 from that micro simulator. For example, a receiver 18 located at point T1 in FIG. 6 will receive a strong local GNSS signal 26 from MS 20P, since it is within the transmission range of MS 20P. The local GNSS signal 26 from MS 20Q will be relatively very weak since point T1 is beyond the transmission range of MS 20Q. Similarly, at points T2 and T3 the receiver will predominantly receive local GNSS signals 26 from MS 20Q and MS 20R, respectively. Accordingly, at points T1, T2, and T3, GNSS receiver 18 will compute and return locations corresponding to the locations of MS 20P, MS 20Q, and MS 20R, respectively (or nominal locations related to these locations).

When GNSS receiver 18 is located in overlap area 37, such as at points T4 and T5 in FIG. 6, the receiver will receive two local GNSS signals 26. In that situation the GNSS receiver will compute its location as an average of the two, or at about the halfway point s/2. Accordingly, it may be appreciated that the resolution of system 10 of the present invention is about half the spacing between adjacent micro simulators, or about s/2. For example, if the separation distance "s" between micro simulators in a particular installation is 50 meters, then the position resolution will be 25 meters. It may also be appreciated that this configuration enables position values to transition relatively smoothly by steps of s/2 instead of steps of length "s".

Another aspect of system 10 of the present invention is the selection of satellites to be transmitted as simulated GNSS signals by each MS. As noted, in the example configuration of FIG. 6 there are twelve satellites, Sat-1 to Sat-12, that are generally visible or overhead, above barrier 34, at a particular time. These satellites are known to the system through direct reception of the satellite signal 14 by one or more associated outdoor micro simulators, and/or from information provided by the almanac, which is carried by all satellites. According to some embodiments of the invention, the almanac and ephemerides may also be received by the system through other means than by satellite signals, such as from the Internet or from another external source.

According to some embodiments of the present invention, system 10 is preferably configured so that each micro simulator transmits signals of a different set of satellites than the satellites transmitted by adjacent micro simulators. As shown in FIG. 6, local GNSS signal 26 of MS 20P transmits signals corresponding to satellites 2, 5, 7, and 12. MS 20Q transmits signals from satellites numbered 1, 4, 8, and 9, and MS 20R transmits signals from satellites numbered 2, 6, 7, and 11. Accordingly, there are no satellite signals in common between adjacent micro simulators MS 20P and MS 20Q (i.e 2,5,7,12 and 1,4,8,9), and between MS 20Q and MS 20R (i.e 1,4,8,9 and 2,6,7,11). While satellites 2 and 7 are both used in MS 20P and MS 20R, this is acceptable because MS 20P and MS 20R are not adjacent.

An advantage of transmitting different sets of satellites from adjacent micro simulators is that it reduces the risk of error by the GNSS receiver. For example, suppose that the satellites of MS 20Q were 1,5,8,9 instead of 1,4,8,9, so that satellite 5 was now in common with MS 20P. A receiver at point T4 in overlap area 37, for example, would pick up satellite 5 from two local GNSS signals, that of MS 20P and MS 20Q. Since each satellite 5 emanates from a different source, it may cause inaccuracies and possible multipath error at the receiver. Errors may also occur even outside of the overlap area, for example at T1 or T2, where the receiver would receive a strong satellite 5 and a weaker satellite 5 from a different path. This risk may be avoided through selection of distinct satellite selections by adjacent micro simulators.

According to some embodiments of the invention, if adjacent micro simulators were to have a satellite in common, for any particular reason, the MS could be configured to lower the power of the channel carrying the satellite in common, thereby reducing the risk of inaccuracy or error described above.

In order to ensure appropriate satellite assignment, each micro simulator communicates its selected satellites to the adjacent micro simulator. For example, MS 20P communicates to MS 20Q that MS 20P is using satellites 2,5,7, and 12. The self-alignment algorithms of MS 20Q use this information to select a distinct set of four satellites, such as 1,4,8, and 9.

It may also be noted that in cases where only horizontal navigation is needed, for example inside a tunnel as shown in FIG. 3, then each micro simulator would only need to simulate the signals of three satellites instead of four satellites.

In local GNSS signals 26, each satellite transmission includes a time of transmission "t". This time forms part of the information used by GNSS receiver 18 to compute location, i.e. the transmitting MS or nominal location offset from the transmitting MS. In order to provide accurate and smooth navigation, the micro simulators in system 10 need to be synchronized with one another. As noted, in the case where there is a live connection, the MS's would also be synchronized with the clock of satellites 12.

According to some embodiments of the invention, synchronization may be achieved by selecting outdoor MS 20 as the synchronization master. Outdoor MS 20 is an Out-Rx-In-Tx type, and so receives GNSS satellite signals 14 directly, and calculates its time offset dT with the satellite clock. Outdoor MS 20 transmits its own set of four or more simulated satellite signals, either by repeating the signals received from the satellites or by simulating the signals in the manner of indoor micro simulators 20. Outdoor MS 20 also uses the communication channel 22 to relay its time offset from the GPS satellite clock to adjacent indoor MS 20.

Indoor MS 20 receives at its receiver Rx the simulated satellite signals from outdoor MS 20, and uses the signal information to compute a location. The computed location is only the location of outdoor MS 20, but a by-product of the computation is the time offset between the clock of outdoor MS 20 and indoor MS 20.

The process continues sequentially, with every other indoor MS 20 receiving the local GNSS signals 26 from its adjacent indoor MS 20 (such as from the MS immediately to its left as drawn in FIG. 1), and uses those signals to compute its time offset from the adjacent indoor MS 20. Each indoor MS 20 then sends, on communication line 22, the cumulative time offset, i.e the total time offset from outdoor MS 20 up to that point, to the next adjacent MS 20 in sequence (i.e the one to the "right"). In the example of FIG. 6, MS 20Q detects local GNSS signal 26 from MS 20P, and uses this information to determine its time offset to MS 20P. In this manner, all indoor MS's 20 eventually obtain their respective time offsets from master outdoor MS 20 and so become synchronized to the satellite GPS clock.

As noted, any micro simulator 20 could be used as the synchronization master, to make the timing of system 10 internally consistent. A GPS receiver 18 that is inside enclosed area 17 navigates according to time as kept by system 10, not according to GPS satellite time. Nevertheless, it is preferable to synchronize system 10 to the GPS satellite clock as described above, by using outdoor MS 20 as the synchronization master, in order to provide smooth handoff of the GPS receiver 18 upon entering and exiting enclosed area 17. Systems 10 that are synchronized to a master MS that is not synchronized to the satellite clock will likely cause GPS receivers to lose location information, at least for a short time, upon entering and exiting enclosed area 17. It may also be noted that in principle, indoor micro simulators 20 could be individually or collectively synchronized by cable connections to a common clock that is in turn is synchronized to the GPS satellite clock, though this is less preferable than synchronizing from outdoor MS 20 as described above.

In order for an indoor MS 20 to transmit the simulated satellite signals 26 associated with the nominal location, the MS must know the ephemerides of the satellites whose signals are being simulated. These ephemerides values could be obtained from the Internet or a telecommunications connection. Alternatively the ephemerides may be obtained from outdoor MS 20, which can receive the ephemerides of all satellites in view through its reception of GNSS satellite transmission signals 14, and then transmit these values on communication channel 22 to the indoor MS's in the system. In this way, by periodically transmitting the ephemerides, outdoor MS 20 both updates the ephemerides used by indoor MS's 20 and ensures that the indoor MS's simulate only satellites that are currently visible.

The operation of the present invention, according to some embodiments, may now be reviewed. Master outdoor MS 20 begins by receiving GNSS satellite transmission signals 14, and uses that to acquire the time offset dT to the GPS satellite clock and the ephemerides of visible satellites. Optionally the almanac may be obtained, to assist the MS in anticipating which other satellites may be coming into view. The outdoor MS selects four satellites and a power level for transmitting indoors, and communicates to adjacent indoor MS 20 the satellite time offset dT, the ephemerides of all satellites 1-12, the satellites it selected, and its power transmission level.

Figure 7A:
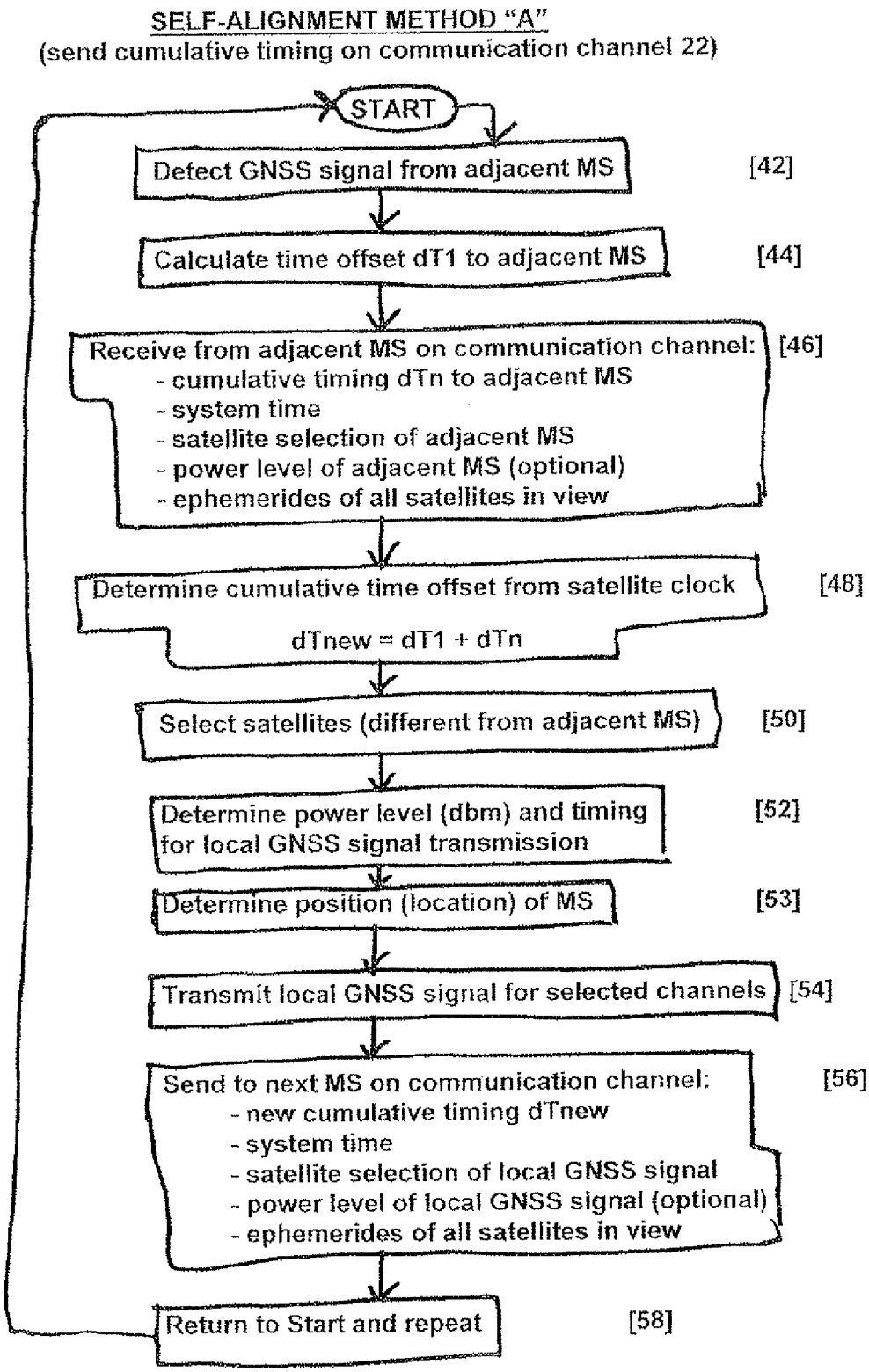
FIG. 7A is a flow chart of one type of self-alignment algorithms performed by the micro simulators, consistent with an embodiment of the present invention.

According to some embodiments of the invention, there is a method of self-alignment, designated method "A" for convenience, that is described by the flow chart of FIG. 7A. In this method an external (wired or wireless) communication channel 22 is used to synchronize time between micro simulators. The local GNSS signal 26 measures the time delay between the MS's and can be used to measure MS location. This system needs as many synchronization masters as there are dimensions of the system (i.e one station per dimension) and each MS should be connected to as many adjacent MS's as there are dimensions of the system.

The flow chart of FIG. 7A illustrates self-alignment method A, according to some embodiments of the invention. After startup, in module 42 the MS detects local GNSS signal 26 from the adjacent MS. From this, in module 44 the MS calculates its time offset dT1 to the adjacent MS. In module 46 indoor MS receives information from the adjacent MS containing cumulative timing dTn, system time, satellite selection, optionally the power level, and ephemerides of all satellites 1-12. The system time is simply the synchronized time of the system provided by the master MS. In module 48 the indoor MS determines the time offset relative to the GPS satellite clock, dTnew=dT1+dTn. In module 50 the MS selects four satellites for local transmission, where those satellites are different from those used by the adjacent MS. In module 52 the MS determines the power level (dbm) and timing of transmission of local GNSS signal 26. In module 53 the MS determines its position or location using the above information.

In module 54 MS transmits local GNSS signal 26 for the selected satellites, using dTnew to obtain an appropriate time of transmission, and using the determined power level. The signal includes timing information and the ephemerides of the four selected satellites. More particularly, the MS calculates the parameters of local GNSS signal 26. The MS calculates what time "t" to apply to each channel, so that, using ephemerides, the GNSS signal gives a position that it wants the receiver to have. i.e. the location coordinates of the MS, or a nominal position related to the MS position.

In module 56 the indoor MS sends to the next MS in sequence information of cumulative timing offset dTnew, the system time, the satellites it selected, optionally its power level, and the ephemerides of all satellites. Control then returns to start module from module 58, and the cycle repeats. The same procedure is followed by all the other micro simulators in system 10.

According to some embodiments of the invention, there is a type of self-alignment called method "B" for convenience. In this method communication channel 22 uses the GPS C/A codes as described above. The local GNSS signal 26 synchronizes the system time and communication channel 22 is used to measure time delay or distance between MS stations. Like method "A", in this case the system needs as many master MS's as there are dimensions of the system, i.e one station per dimension, and each MS should be connected to as many adjacent MS's as there are dimensions of the system.

Figure 7B:
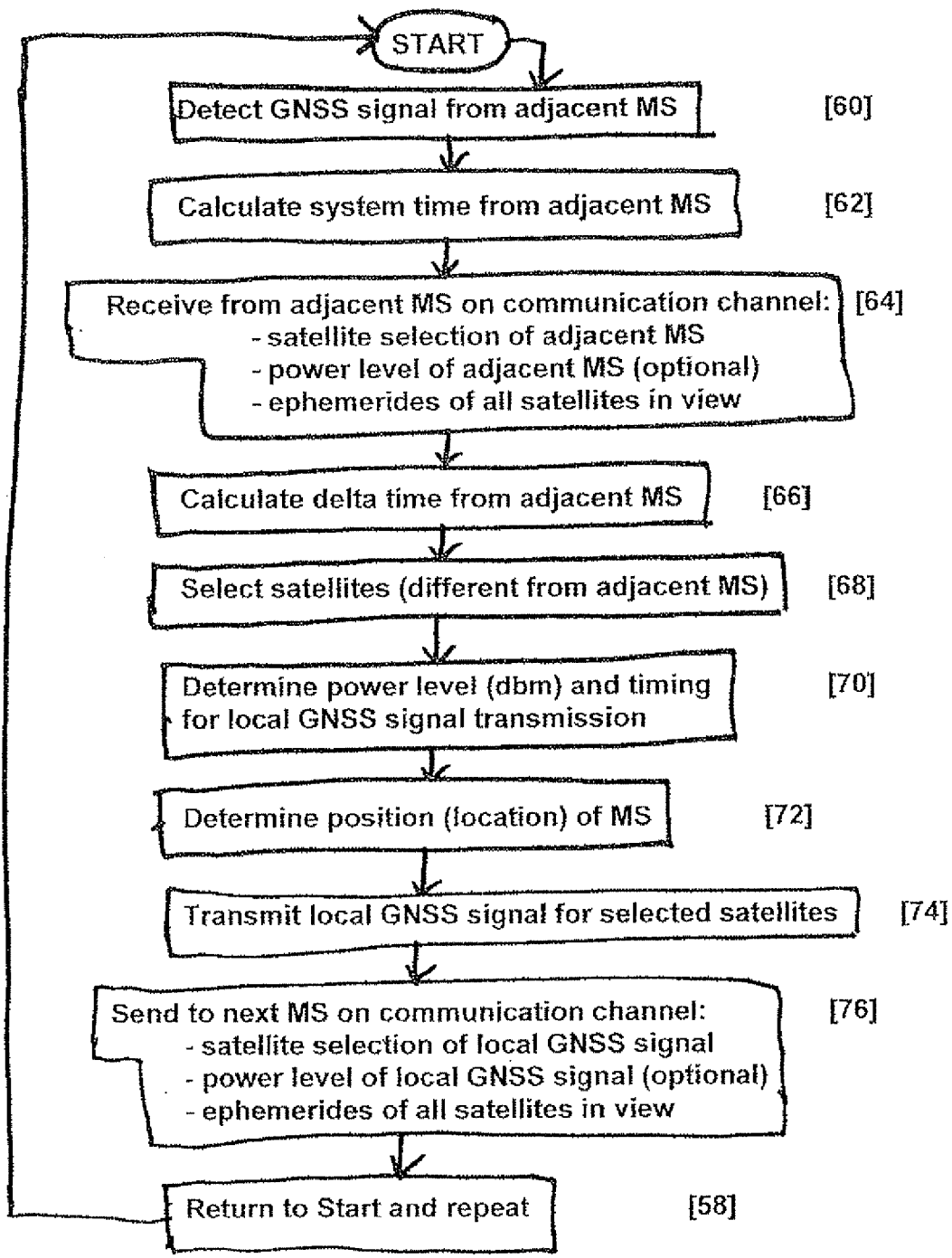
FIG. 7B is a flow chart of another type of self-alignment algorithms performed by the micro simulators, consistent with an embodiment of the present invention.

Turning to the flow chart of FIG. 7B, at module 60 the MS detects local GNSS signal 26 from adjacent MS. At module 62 the MS calculates the system time from the adjacent MS. At module 64 the MS receives from adjacent MS on the communication channel: the satellite selection of adjacent MS, optionally the power level of adjacent MS, and the ephemerides of all the satellites in view. At module 66 MS calculates the delta time from adjacent MS. At module 68 MS selects satellites for transmission. At module 70 MS determines the power level and timing for local GNSS signal 26. At module 72 MS determines its position. At module 74 the MS transmits local GNSS signal 26 for the selected satellites. At module 76 the MS sends to the next MS on the communication channel: its satellite selection, optionally the power level, and the ephemerides of all the satellites in view. At module 58 it returns to start and repeats.

Another aspect of the power alignment of the system 10 of the present invention is that if the power of transmission of a particular MS is too large, the adjacent MS may detect this and communicate a message to reduce power. For example, in FIG. 6, if the transmission power of MS 20Q becomes too large, as represented by circle 36Q getting larger and getting too close to MS 20P and MS 20R, then MS 20P and/or MS 20R may communicate with MS 20Q, on channel 22, to reduce transmission power. According to some embodiments of the invention, the detection of power may be done by the reception of the local GNSS signal 26. According to other embodiments of the invention, the detection of power may be done through the power level being communicated on communication channel 22.

It may be appreciated that in this way, the self-alignment algorithms calculate, control, and generate the power levels and timing of the transmitted local GNSS signals 26, and select the satellites to be transmitted. Accordingly, each micro simulator is dynamically controlled by these algorithms.

Figure 8:
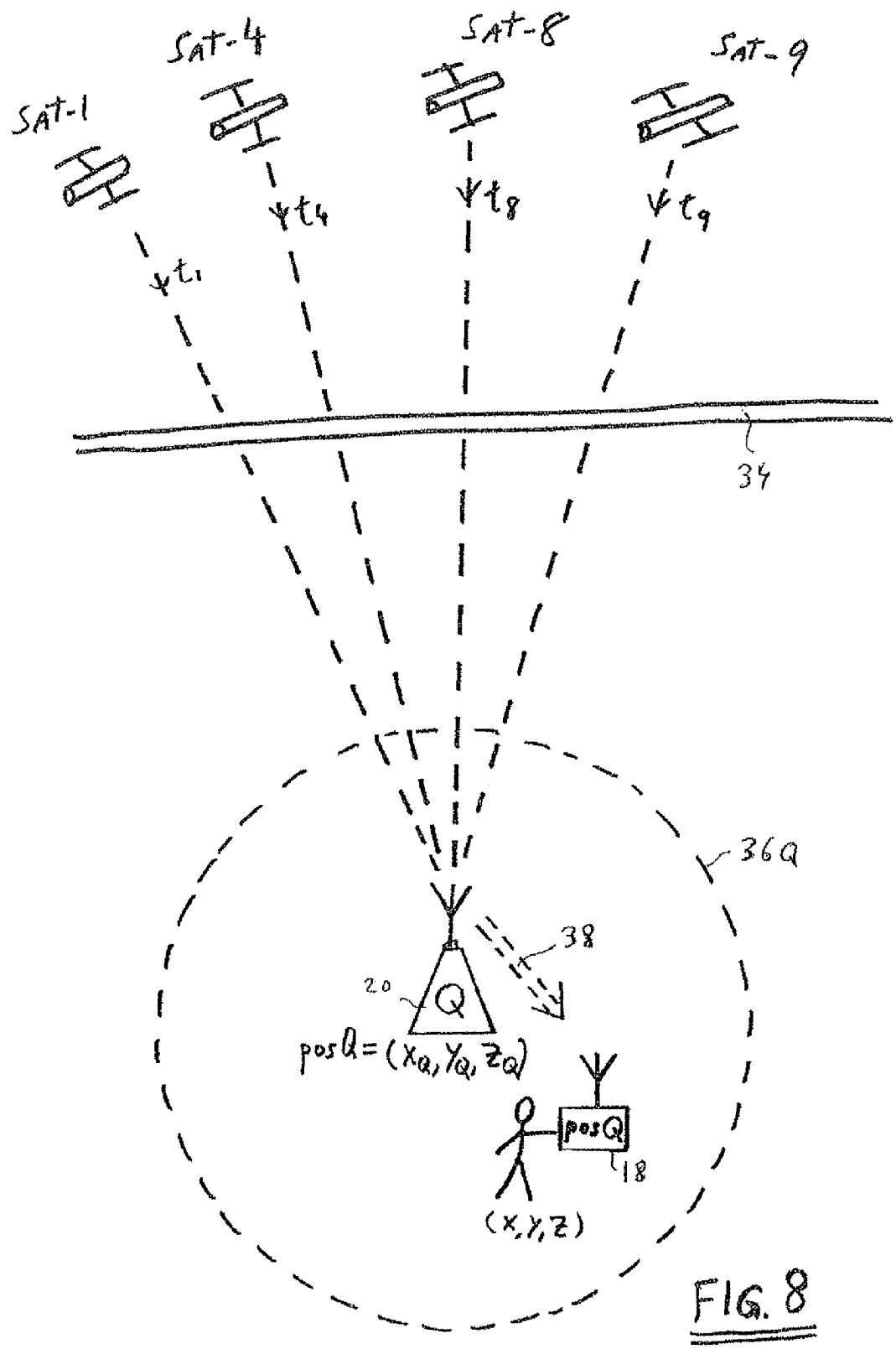
FIG. 8 is a block diagram of micro simulator "Q" of FIG. 6, illustrating how the invention is used to provide GNSS signals to a nearby receiver.

FIG. 8 illustrates the effect of system 10 of the present invention, with respect to representative micro simulator MS 20Q of FIG. 6. As indicated, the effect is as if barrier 34 has been removed and is no longer there, so that selected satellites 1, 4, 8, and 9 are free to transmit and have their signals 14 received at MS 20Q. These signals, which contain C/A codes and time of transmission "t" for each channel, and their ephemerides, are re-transmitted or simulated at a lower power level, shown by dashed arrow 38, so that GNSS receiver 18 within range of transmission of local signal 26 of MS 20Q receives the signal as if it were located at position Q ("posQ"). The local signal 26 is accordingly compatible with transmitted satellite signals 14.

In FIG. 2A the layout of MS's is linear, or one-dimensional. In cases of two-dimensional or three-dimensional arrays of MS's, more master MS's are provided. Specifically, at least two master MS's are provided for two-dimensional arrays and at least three master MS's for three-dimensional arrays. In these cases the locations of MS's are obtained by triangulation based on round-trip signal travel times among the micro simulators. The process starts with round-trip signal travel times between the outdoor MSs and the adjacent indoor MS's, and takes into account the fixed and known delays within micro simulators in responding to received triangulation signals. By contrast, the locations of micro simulators of a linear layout such as the layout of FIG. 2A are obtained by conventional surveying methods.

Figure 9A:
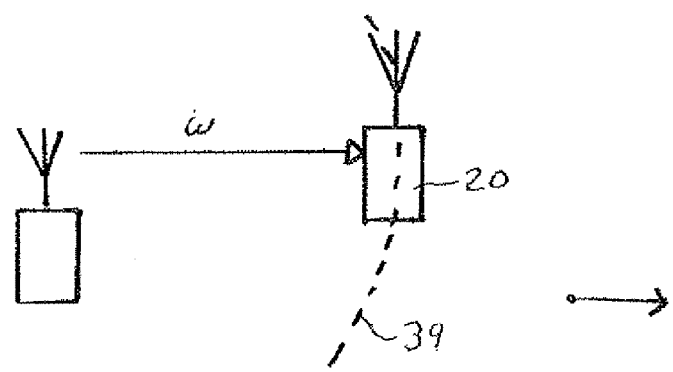
FIG. 9A is a block diagram showing calculation of timing offset dT between a micro simulator and a single reference micro simulator, consistent with an embodiment of the present invention.
Figure 9B:
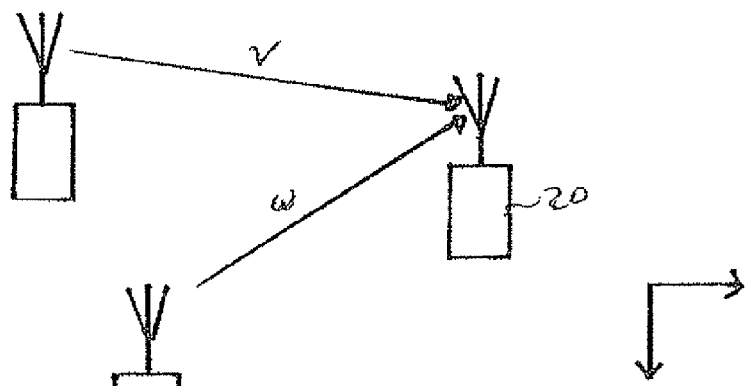
FIG. 9B is a block diagram showing calculation of timing offset dT between a micro simulator and two reference micro simulators, consistent with an embodiment of the present invention.
Figure 9C:
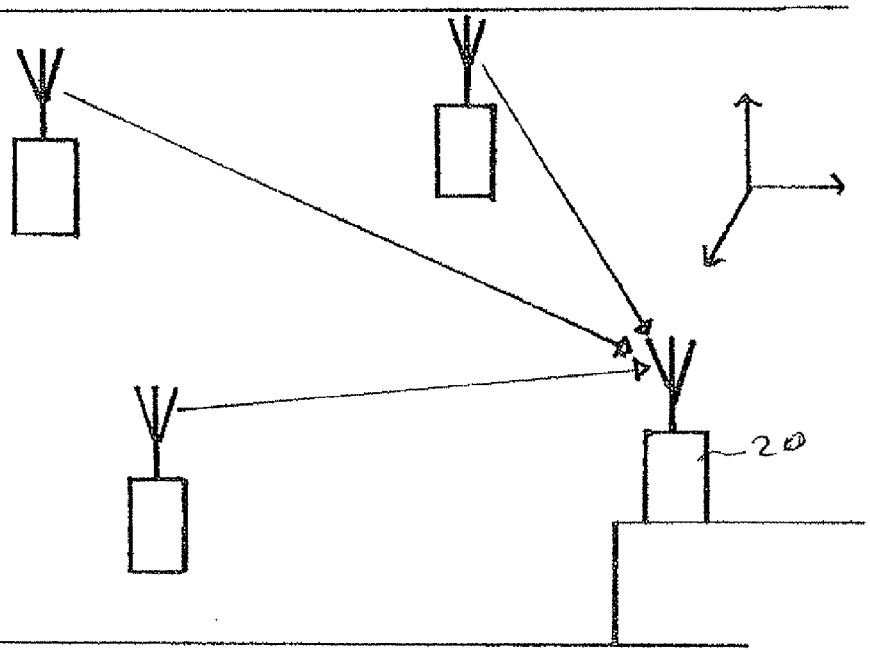
FIG. 9C is a block diagram showing calculation of timing offset dT between a micro simulator and three reference micro simulators, consistent with an embodiment of the present invention.

Triangulation may be further explained using FIGS. 9A-C and the examples of FIGS. 3-5. FIG. 9A shows MS 20 obtaining time offset dT with respect to a single adjacent reference micro simulator. The distance from the reference micro simulator to MS 20 is indicated by arrow "w". It can be seen that MS 20 can move along an arc 39 having a radius "w". However, at any position along the arc the distance from the reference MS is the same, so the time offset dT will be the same. The time offset will remain the same even as MS 20 moves in two-dimensional space. Accordingly, obtaining a time offset from one reference is not sufficient to fix the location of MS 20 in two-dimensional space.

This may be resolved by using two reference micro simulators, as shown in FIG. 9B. The distance from each reference is "w" and "v". In this case, as MS 20 moves in a plane, at least one of the reference distances will also change, i.e. there will be a unique "v" and "w" for each position of MS 20 in two-dimensional space. Similarly, by the same principle, in order to determine the location of MS 20 in three dimensional space, three reference micro simulators should be used, as shown in FIG. 9C.

Turning now to the examples of FIGS. 3-5, it may be seen that in the tunnel example of FIG. 3, the only significant motion that occurs in the tunnel is progress along the straight road 30. For this application therefore use of a single reference MS should be sufficient. Outdoor MS 20 on the left could be the master, and adjacent indoor MS 20m1 could synchronize with it, then MS 20m2 would synchronize with MS 20m1, etc.

In the floor or room example of FIG. 4, movement will occur in two dimensions but likely not in three dimensions (i.e not up and down). It is accordingly important to obtain synchronization in two dimensions. The two outdoor micro simulators could be masters, or one outdoor and one indoor, to maintain a live connection. As an example, synchronization may proceed as follows: indoor MS 20k1 synchronizes from the two outdoor MS's. Then indoor MS 20k2 synchronizes from one of the outdoor MS's and from indoor MS 20k1. Indoor MS 20k3 then synchronizes from indoor MS's 20k1 and 20k2, etc.

The process is the same for the multi-story example of FIG. 5. Here movement is in all three dimensions, including up and down. Accordingly, three reference or master micro simulators are needed for synchronization. These may be, for example, the three outdoor micro simulators. Synchronization may proceed as follows: indoor MS 20d1 synchronizes from the three outdoor micro simulators. Then indoor MS 20d2 synchronizes from two of the outdoor micro simulators and from indoor micro simulator 20d1. Then indoor MS 20d3 synchronizes from one of the outdoor micro simulators and from indoor micro simulators 20d1 and 20d2. Then indoor MS 20d4 synchronizes from three indoor MS's 20d1, 20d2, and 20d3.

Figure 10A:
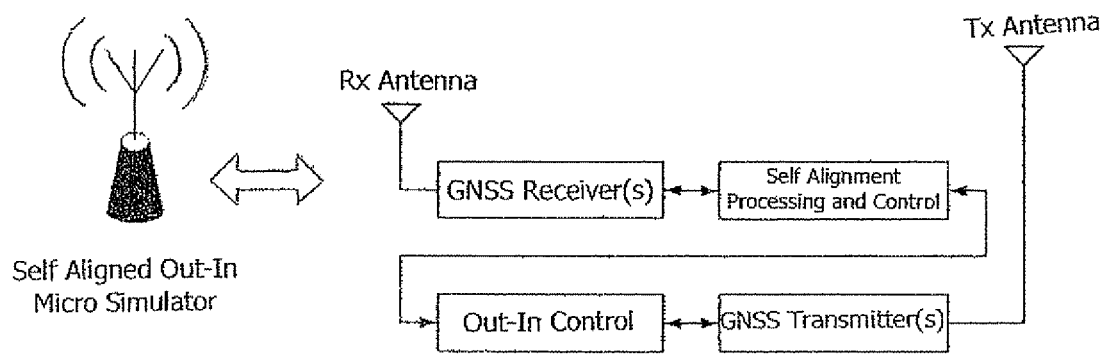
FIG. 10A is a block diagram of an exterior or outdoor micro simulator for use in an indoor satellite navigation system consistent with an embodiment of the present invention.
Figure 10B:
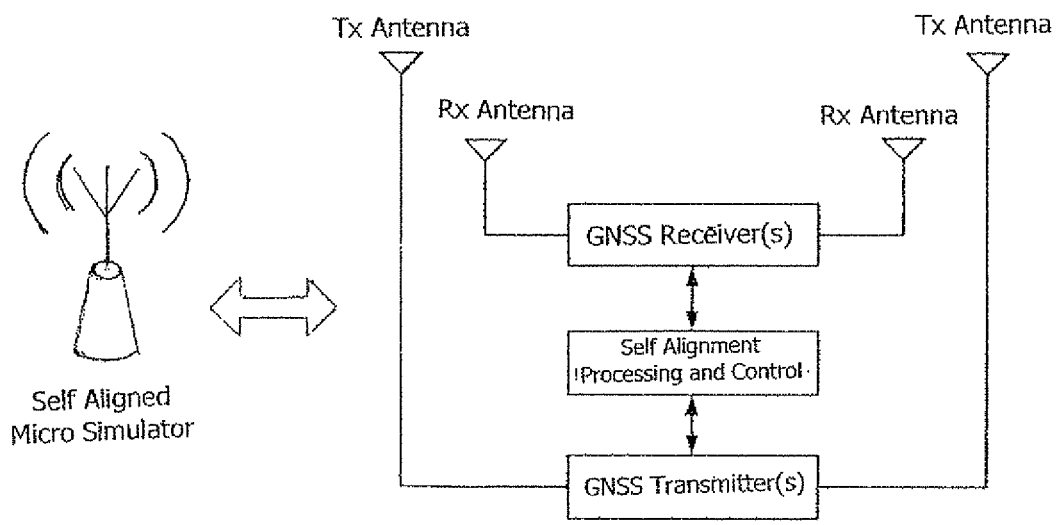
FIG. 10B is a block diagram of an interior or indoor micro simulator for use in an indoor satellite navigation system consistent with an embodiment of the present invention.

Block diagrams of outdoor and indoor micro simulators, according to some embodiments of the invention, are shown in FIGS. 10A and 10B, respectively.

As indicated, outdoor MS has a single receiver Rx to receive the GNSS signals from GNSS satellites. This information is processed by a self alignment processing and control module and subsequently by an out-in control module, before being transmitted as a local GNSS signal from transmitter Tx.

Some of the advantages of system 10 of the present invention may now be reviewed.

In a live connection, the system provides a live reading based on real satellites overhead. This provides a dynamically changing infrastructure that adapts itself and attributes transmitted GNSS signals to the enclosed area environment. Each micro simulator automatically measures its relative location with respect to its neighbour, which are other self aligned micro simulators, calibrates itself, and transmits the required signal accordingly.

Since the system transmits GNSS satellite signals that contain the same information and are on the same frequency as signals transmitted by satellites, regular GNSS receivers may be used. More particularly, no modifications need to be made to the hardware or firmware of the receivers. Similarly, there are no special "modes" in which the receiver needs to operate, or augmented information that the receiver has to be configured to use.

When synchronization occurs with the satellite's UPS clock, such as when an outdoor MS is used, system 10 enables users to enter or exit from enclosed areas 17 with no discontinuity or disruption. Inside enclosed areas 17 system 10 full and continuous coverage is provided, whether synchronization is with the satellite's GPS clock or just between the micro simulators of the system.

Since each local GNSS signal 26 carries simulated signals of four satellites, multipath is not a problem because all four satellite signals travel the same path to the receiver.

Full coverage can easily be provided in an enclosed area 17 by providing sufficient number of micro simulators to cover the area.

The invention enables continuous navigation in areas that were previously unable to receive satellite signals, or where the signals were too weak to be processed by conventional GNSS receivers. The invention disributes micro simulators that combine GNSS receivers and GNSS transmitters to best cover the enclosed area.

The GNSS-like signals generated by the infrastructure of this invention are controlled and processed by self alignment algorithms that synchronize them with signals from actual satellites.

Returning to FIG. 1B, and noting that except in overlap areas 37 GNSS receiver 18 receives the signals that would be received from four satellites at the nominal location of the nearest micro simulator 20, it is common to transform the equations shown in FIG. 1B to a set of linear equations $$\begin{bmatrix} \delta\rho_1 \\ \delta\rho_2 \\ \delta\rho_3 \\ \delta\rho_4 \end{bmatrix} = \begin{bmatrix} \alpha_{11} & \alpha_{12} & \alpha_{13} & 1 \\ \alpha_{21} & \alpha_{22} & \alpha_{23} & 1 \\ \alpha_{31} & \alpha_{32} & \alpha_{33} & 1 \\ \alpha_{41} & \alpha_{42} & \alpha_{43} & 1 \end{bmatrix} \begin{bmatrix} \delta X \\ \delta Y \\ \delta Z \\ \delta\beta \end{bmatrix} \quad (1)$$

where $\delta\rho_i$ is the differential range of the i-th satellite that is simulated by the nearest micro simulator 20, $\delta X$, $\delta Y$ and $\delta Z$ are the differential positions of GNSS receiver 18, $C\delta T$ is the differential clock bias, and the $\alpha_{ij}$ are defined as $$\alpha_{i1}=(x_i-X)/(\rho_i-CdT)$$

$$\alpha_{i2}=(y_i-Y)/(\rho_i-CdT)$$

$$\alpha_{i3}=(z_i-Z)/(\rho_i-CdT) \quad (2)$$

and similarly for the case of more than four satellites, for example the typical case of eight simulated satellite signals in overlap areas 37. With N satellites, the vector on the left hand side of equation (1) has N elements, the matrix has N rows and four columns, and the vector on the right hand side of equation (1) is the same four-element vector as is shown above. In matrix form, equation (1) is $$\delta\rho = A\delta X \quad (3)$$

The detailed derivation of equations (1)-(3) from the equations of FIG. 1B can be found in J. B. Tsui, *Fundamentals of Global Positioning System Receivers*, second edition, John Wiley, 2005.

Preferably, each micro-simulator 20 modifies the signals that it transmits by appending an N×N diagonally dominant (hence invertible) weighting matrix W to equation (3) such that $$W\delta\rho = A\delta X \quad (4)$$

The resulting signals are amenable to the standard Least Squares Estimation performed in standard GNSS receivers. The matrix W is designed such that the location computed by GNSS receiver 18 is closer to the true location of GNSS receiver 18 than the location of the nearest micro-simulator 20 or (if GNSS receiver 18 is in overlap area 37) the average of the locations of the two nearest micro-simulator 20. It will be clear to those skilled in the art how to determine the elements of the matrix W for this purpose. With the additional degrees of freedom provided by W one can easily manipulate user position to the required area. This solution is a generalization of the standard position calculation in which W is a unit matrix.

More generally, an appropriate non-linear transformation of the left-hand-side of equation (3) is performed at microsimulators 20 in order to "deceive" GNSS receiver 18 into computing a better approximation to its true position. The linear transformation of multiplication by the matrix W is preferred for its relative computational simplicity.

Although selected embodiment(s) of the present invention has/have been shown and described, it is to be understood that the present invention is not limited to the described embodiment(s). Instead, it is to be appreciated that changes may be made to this/these embodiment(s) without departing from the principles and spirit of the invention, the scope of which is defined by the claims and the equivalents thereof.

The invention claimed is:

1. A system, for supporting navigation in an enclosed area, comprising:
    at least three spaced-apart micro simulators, each said micro simulator configured to transmit a local Global Navigation Satellite System (GNSS) signal, based on at least three satellite GNSS signals from at least three GNSS satellites of a GNSS satellite system, that represents a different respective location associated with said each micro simulator, said micro simulators including:
        a first micro simulator defining a master micro simulator:
        a second micro simulator synchronized directly to said first micro simulator;
        a third micro simulator synchronized indirectly by being directly synchronized to said second micro simulator and,
        at least said second and third micro simulators being located within the enclosed area;
    wherein said local GNSS signal of each said micro simulator is modified by said each micro simulator in a manner that adjusts the overall average position error.

2. The system of claim 1, wherein said second micro simulator is configured to synchronize itself with said master micro simulator by determining a time offset between a clock of said master micro simulator and a clock of said second micro simulator, and wherein said third micro simulator is operative to synchronize itself with said master micro simulator by determining a time offset between said clock of said second in micro simulator and a clock of said third micro simulator.

3. The system of claim 1, wherein said master micro simulator is outside the enclosed area and receives GNSS satellite signals defining a constellation of GNSS satellites.

4. The system of claim 1, herein said master micro simulator is inside the enclosed area.

5. The systems of claim 1, wherein said local GNSS signal of each said micro simulator simulates signals that would be received from at least three GNSS satellites of said GNSS satellite system, through the master micro simulator.

6. The system of claim 5, wherein said modifying includes, for each said micro simulator, linear transformations of respective vectors of differential ranges of said GNSS satellites.

7. The system of claim 5, wherein said modifying includes, for each said micro simulator, nonlinear transformations of respective vectors of differential ranges of said GNSS satellites.

8. The system of claim 1, wherein, for at least one said micro simulator, said respective location that is associated with at least one of said at least one micro simulator is a location of said each micro simulator.

9. The system of claim 1, wherein, for at least one said micro simulator, said respective location that is associated with at least one of said at least one micro simulator is displaced from a location of said each micro simulator by a predetermined displacement.

10. The system of claim 1, further comprising:
    a communication channel for facilitating exchanging information among said micro simulators.

11. The system of claim 10, wherein said information includes information about local signal power levels.

12. The system of claim 11, wherein said information includes, for each said micro simulator, an identity of each of at least one GNSS satellite whose signals are simulated by said each micro simulator.

13. The system of claim 12, wherein each said local GNSS signal includes simulated signals of at least three GNSS satellites of said GNSS satellite system, and wherein each said micro simulator is configured to select GNSS satellites, for said simulation, that are different from said GNSS satellites whose signals are simulated by any adjacent said micro simulator.

14. The system of claim 13, wherein said micro simulators of each pair of said adjacent micro simulators are spaced apart by a respective separation distance, and wherein a transmission range of said local GNSS signals is between about half of said separation distance and about said separation distance.

15. The system of claim 14, wherein said transmission range of said local GNSS signals is about 0.7 of said separation distance.

16. The system of claim 10, wherein said communication channel is wireless.

17. The system of claim 10, wherein said communication channel includes wired connections between adjacent said micro simulators.

18. The system of claim 10, wherein said information is modulated onto C/A codes other than C/A codes that arc used in said local GNSS signals.

19. A system, for supporting navigation in an enclosed area, comprising:
    at least three spaced-apart micro simulators, each said micro simulator configured to transmit a local Global Navigation Satellite System (GNSS) signal, based on at least three satellite GNSS signals from at least three GNSS satellites of a GNSS satellite system, each said local GNSS signal representing a different respective location associated with said each micro simulator, said at least three spaced-apart micro simulators including:
        two micro simulators defining master micro simulators;
        a third micro simulator synchronized, with said two micro simulators, and at least said third micro simulator being located within the enclosed area, and,
    wherein said local GNSS signal of each said micro simulator is modified by said each micro simulator in a manner that adjusts the overall average position error.

20. The system of claim 19, wherein said local GNSS signal of each said micro simulator simulates signals that would be received from at least three GNSS satellites of said GNSS satellite system.

21. The system of claim 19, wherein one of said master micro simulators is outside the enclosed area and receives GNSS satellite signals from a constellation of GNSS satellites.

22. The system of claim 19, wherein one of said master micro simulators is located within the enclosed area.

23. The system of claim 19, wherein said at least three spaced-apart Micro simulators includes at least four said spaced-apart micro simulators, three of said Micro simulators being master Micro simulators to which a fourth said micro simulator is synchronized, with at least said fourth micro simulator being located within the enclosed area.

24. A system, for supporting navigation in an enclosed area, comprising:
- three spaced-apart micro simulators, each said micro simulator configured to transmit a local Global Navigation Satellite System (GNSS) signal, based on the signals of GNSS satellites, each of the local GNSS signals representing a different respective location associated with said each micro simulator, said three spaced-apart micro simulators comprising:
  - a first said micro simulator being a master micro simulator;
  - a second micro simulator synchronized directly to said, first micro simulator;
  - a third micro simulator synchronized indirectly to said first micro simulator by being directly synchronized to said second micro simulator,
- at least said second and third micro simulators being located within the enclosed area; and,
- a communication channel for facilitating exchanging information among said first, second and third micro simulators, said information including, for each said micro simulator, an identity of each of at least one GNSS satellite whose signals are simulated by each said micro simulator.

25. The system of claim 24, wherein each said local GNSS signal includes simulated signals of at least three GNSS satellites, and wherein each said micro simulator is operative to select GNSS satellites, for said simulation, that are different from said GNSS satellites whose signals are simulated by any adjacent said micro simulator.

26. The system of claim 25, wherein said micro simulators of each pair of said adjacent micro simulators are spaced apart by a respective separation distance, and wherein a transmission range of said local GNSS signals is between about half of said separation distance and about said separation distance.

27. The system of claim 26, wherein said transmission range of said local GNSS signals is about 0.7 of said separation distance.

* * * * *